Jan. 10, 1956  E. W. DASZEWSKI  2,730,467
INSULATED ELECTRICAL CONDUCTORS
Filed Sept. 21, 1954
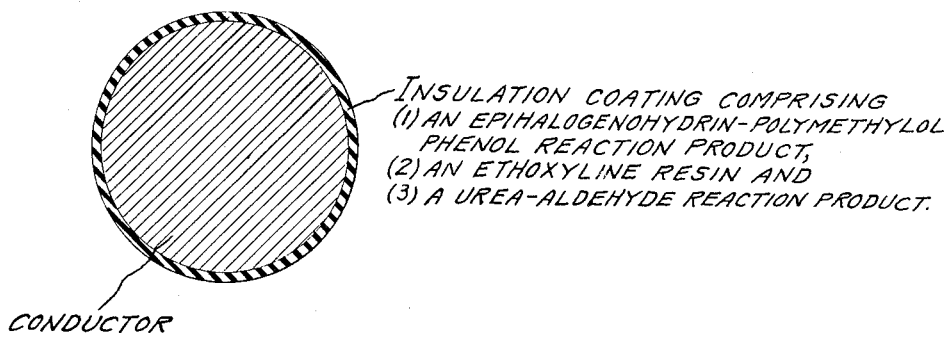
CONDUCTOR
Insulation coating comprising
(1) an epihalogenohydrin-polymethylol phenol reaction product,
(2) an ethoxyline resin and
(3) a urea-aldehyde reaction product.
Inventor:
Edward W. Daszewski,
by [signature]
His Attorney.

United States Patent Office 2,730,467
Patented Jan. 10, 1956

2,730,467
INSULATED ELECTRICAL CONDUCTORS

Edward W. Daszewski, Scotia, N. Y., assignor to General Electric Company, a corporation of New York Application September 21, 1954, Serial No. 457,477

3 Claims. (Cl. 117—232)

This invention relates to insulated electrical conductors. More particularly, the invention is concerned with insulated electrical conductors in which the insulation on the conductor exhibits the highly desirable properties of hardness, flexibility, toughness, abrasion resistance and solvent resistance.

The new and improved insulated conductors of the present invention are produced from coating compositions comprising (a) compounds corresponding to the general formula

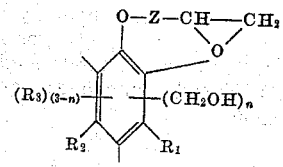

where Z is an alkylene radical, for instance, methylene, ethylene, propylene, isopropylene, butylene, etc., $R_1$, $R_2$ and $R_3$ are the same or different substituents selected from the class consisting of hydrogen, halogen, alkyl radicals, aryl radicals, and aralkyl radicals, and $n$ is a whole number equal to from 1 to 3; (b) a complex epoxide resin comprising a polyether derivative of a polyhydric organic compound, e. g., a polyhydric alcohol ether in which the said polyether derivative contains epoxy groups which, for brevity, will hereinafter be referred to as an "ethoxyline resin"; (c) an aminoplast resin, for example, the condensation reaction product of a urea and an aldehyde, and (d) a suitable solvent.

It is generally known that without any modification, ethoxyline resins are slow-curing and somewhat brittle, and accordingly unsuitable for certain uses, for instance, as wire coating insulation. When either urea or melamine resins are blended with ethoxyline resins, faster curing time is obtained and the solutions are stable for longer periods of time. However, when combinations of these resin systems are evaluated by application to wire or other conductor, although curing is rapid, the resulting films are somewhat soft but flexible. Attempts have been made to improve the abrasion resistance of urea-ethoxyline resin systems to the point satisfactory for use as wire-coating compositions by the addition of various phenol-aldehyde resin. None of the phenolic resins employed gave a satisfactory wire coating composition with a urea-ethoxyline resin system.

It now has been discovered that excellent coating compositions, particularly useful as wire insulation, can be prepared by blending with a urea-ethoxyline resin composition, compounds corresponding to (a) above, obtained by reacting an epihalogenohydrin corresponding to the general formula

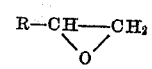

where R is a halogen-substituted aliphatic radical, for example, chloromethyl, chloroethyl, chloropropyl, bromoethyl, etc., with a composition comprising a compound corresponding to general formula

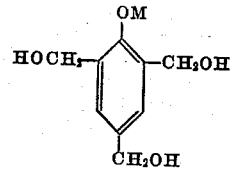

or with mixtures of organic compounds corresponding to the general formula

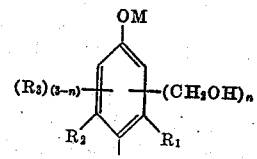

where M is a member selected from the class consisting of hydrogen, sodium, potassium, and barium, and $R_1$, $R_2$ and $R_3$, and $n$ have the meanings given above and preferably, although not essentially, $n$ is equal to 3.

The invention will be understood more readily from the following description when considered in connection with the accompanying drawing, in which the single figure is a cross-sectional view of an electrical conductor provided with insulation in accordance with this invention.

Ethoxyline resins of the type employed in preparing the present compositions are described more fully in Castan Patent 2,324,483, Castan Patent 2,444,333, British Patent 518,057, and British Patent 579,698. Essentially, these ethoxyline resins are based on the resinous product of reaction of an epihalogenohydrin, for instance, epichlorohydrin, and an aliphatic polyhydric alcohol, for example, glycerine or a phenol having at least 2 phenolic-hydroxy groups, for example bis-(4-hydroxyphenyl) dimethyl methane. Further examples of ethoxyline resins which may be employed in the practice of the present invention are disclosed in U. S. Patents 2,494,295, 2,500,600, and 2,511,913. By reference, the aforementioned patents are intended to be part of the present description of the ethoxyline resin used and, for brevity, the ethoxyline resins will not be described other than that they contain more than one epoxide group, e. g., from 1 to 2 or more epoxide groups per molecule, and may be prepared by effecting reaction between a polyhydric phenol or alcohol, for example, phenol, hydroquinone, resorcinol, glycerine, and condensation products of phenols with ketones, for instance, bis-(4-hydroxyphenyl) dimethyl methane with epichlorohydrin. For example, the reaction of epichlorohydrin with bis-(4-hydroxyphenyl) dimethyl methane may be formulated as follows:

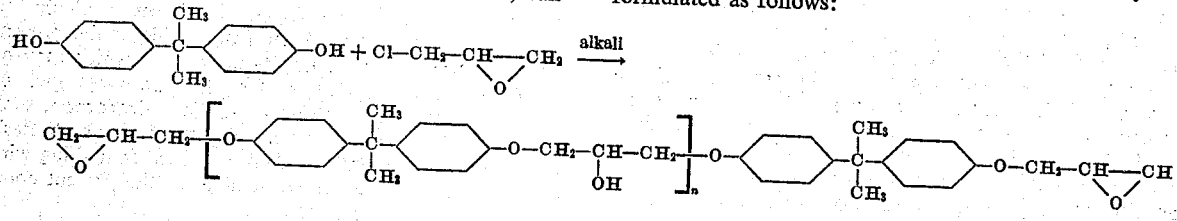

where $n$ has an average value varying from 0 to about 7. Many of these ethoxyline resins are sold under the name of Epon resins by Shell Chemical Corporation or Araldite resins by the Ciba Company. Data on several of the Epon resins found eminently suitable for the purposes of the present invention are given in the table below:

Table I

| Epon No. | Epoxide Equivalent | Approximate Esterification Equivalent | M. P., °C. |
|---|---|---|---|
| RN-34 | 225-290 | 105 | 20-28 |
| RN-48 | 192 | 80 | 9 |
| 1064 | 300-375 | 105 | 40-45 |
| 1062 | 140-165 | | Liquid |
| 1004 | 905-985 | 175 | 97-103 |
| 1007 | 1,600-1,900 | 190 | 127-133 |
| 1009 | 2,400-4,000 | 200 | 145-155 |
| 1001 | 450-525 | 130 | 64-76 |

Urea-aldehyde condensation reaction products found eminently suitable in preparing compositions of the present invention include urea-aldehyde condensates prepared by condensing urea with an aqueous solution of an aldehyde, for example, formaldehyde under controlled conditions of time, temperature and acidity, well known to the art. Examples of other urea-aldehyde condensates which may be employed include the reaction products of a urea with acetaldehyde, propionaldehyde, butyraldehyde, etc.

The starting polymethylol phenyl derivatives employed in preparing the epihalogenohydrin-polymethylol phenyl reaction products used in formulating the resinous compositions of the invention correspond to the general formula

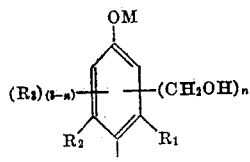

where M is a member selected from the class consisting of sodium, potassium, or barium, and $R_1$, $R_2$ and $R_3$ are members selected from the class consisting of hydrogen, halogen, alkyl, aryl, and aralkyl radicals. These compounds, which hereinafter will be referred to as the "methylol phenyl derivative," may be prepared by effecting reaction between about 1.5 to 3 mols of formaldehyde, preferably from about 1.8 to 2.5 mols formaldehyde, per mol of the phenol derivative corresponding to general formula

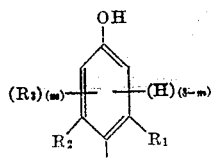

where $m$ is a value equal to from 0 to 2 and preferably $m$ is 0 and $R_1$, $R_2$ and $R_3$ have the meanings given above. The reaction is conducted at a temperature such that no resinous material is formed. This temperature has been found to range, for instance, from about 15° C. up to about 65° C., above which temperature undesirable side reactions may take place. The reaction is conducted in the presence of about 1 mol of alkali or alkaline hydroxide as, for example, sodium hydroxide, potassium hydroxide, and barium hydroxide per mol of the phenol. The extent of the reaction between the hydrin and the methylol phenate will depend on the reactivity of the hydrin and the duration of the reaction, the products containing from 1 to 3 methylol groups. If it is desired to obtain the isolated salt of, for instance, the sodium or barium methylol phenate derivative, it can be precipitated by diluting or pouring the reaction mixture into a suitable water-miscible solvent and separating the salt from the liquid by filtration, decantation or other suitable means.

After the preparation of the methylol metal phenates described above, the latter may then be caused to react with the epihalogenohydrin compound corresponding to the general formula

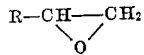

where R is a halogenated aliphatic radical, for example, a chloromethyl radical. For each mol of metal phenate prepared as described above, there is employed at least one mol of the hydrin, for example, 1 mol of epichlorohydrin. If desired, more than one mol of the hydrin may be used per mol of the methylol phenate. Thus, from about 1 to 1.5 or more mols of the hydrin per mol of the metal phenate can be used. Reaction occurs preferentially with the —OM group on the phenyl nucleus, where M has the meaning given above but may also occur to some extent with the methylol groups. The latter reaction with the methylol groups takes place generally after the —OM group has been satisfied and the phenolic groups blocked. From an economical point of view, it is advantageous to use reaction products produced from a mixture of the uni-, bis-, and tris-(hydroxymethyl) compounds where the tris-(hydroxymethyl) derivative is present preferably, though not essentially, in an amount, by weight of the mixture, of over 25% or more, for example, an amount over 50%. The invention is not limited to this percent of the tris-(hydroxymethyl) derivative since smaller (e. g., 10 to 40%) or larger percents (e. g., from 40 to 90%) of the total of the uni- and bis-(hydroxymethyl) phenyl compounds corresponding to the general formula

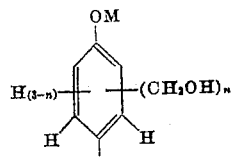

where M has the meaning given above, and $n$ is an integer equal to from 1 to 2 inclusive, may also be used without departing from the scope of the invention.

The proportions of each component employed in preparing the present compositions may be varied within certain limits. Generally, on a weight basis, the ethoxyline resin may be employed in an amount corresponding to from about 10 to about 17%, the urea-aldehyde condensate may be employed in amounts corresponding to from about 7 to about 15%, and the epichlorohydrin derivative of polymethylol phenol may be used in an amount corresponding to from about 0.1 to about 7%. The remainder of the composition is composed of solvent. Advantageously, on a weight basis, the preferred ranges are from about 12 to about 16% ethoxyline resin, from about 9 to about 11% urea-aldehyde resin, and from about 1 to about 4% of the epichlorohydrin derivative of polymethylol phenol.

Solvents found eminently suitable in preparing the wire-coating enamels of the invention include mixtures of a hydrocarbon, for example, an aromatic hydrocarbon, such as benzene, toluene, xylene, or any of the higher boiling aromatic hydrocarbons with an aliphatic ketone, such as methyl ethyl ketone, methyl propyl ketone, methyl isopropyl ketone, methyl isobutyl ketone, etc. Similarly, mixtures of any one of the aforementioned aromatic hydrocarbons may be employed with diacetone alcohol to give excellent vehicles for the resin solids of the present compositions. Other examples of solvents which may be employed include mixtures of a phenolic body, such as cresol, xylenol, etc., with an aromatic hydrocarbon, such as benzene, toluene, xylene, or any of the high flash or other solvent naphthas commonly used in making wire enamels. Another excellent vehicle for the present compositions is a mixture of cresols as commonly found in cresylic acid. Generally, the solvents may be employed in amounts corresponding to from about 60 to about 80%, by weight of the enamel, a preferred range being from about 70 to about 75%, by weight of the enamel.

The folowing examples are given by way of illustration and not by way of limitation. All parts and percentages are by weight.

*Example 1*

This example illustrates the preparation of epoxide resin in which the methylol phenate derivative was prepared in situ so as to give a mixture of methylol phenols, that is, a mixture in which the uni-, bis-, and tris-(hydroxymethyl) phenyl derivatives were present. More particularly, 1.83 part water, 8.34 parts phenol, and 7.33 parts of 50% aqueous sodium hydroxide were placed in a stainless steel kettle and the temperature of the mixture adjusted to 40° C. by means of heated circulating water through the jacket surrounding the kettle. 14.4 parts of 37% aqueous formalin were added slowly during the next fifteen or twenty minutes and the mixture held at 40° C. with constant agitation for a period of thirty minutes, after all the formalin had been added. The resulting product was cooled to room temperature at around 25–28° C. and allowed to stand about fifteen hours. This product, which is identified as product "A," was drawn off into a container. Thereafter, 9.48 parts ethanol and 9.48 parts epichlorohydrin were charged to the same kettle and the temperature adjusted to about 58–60° C. Product "A" was added to the kettle over a thirty-minute period, after which the mixture was reacted at 80° C. with stirring for one hour. The mixture was cooled to 50° C. and the ethanol removed by vacuum stripping. The product was cooled to 30° C. and decanted by removing the water from the top of the reaction mixture. The cooled product had a pH of 9.7. 0.7 part of 37% aqueous HCl was added to the mixture and the product washed with water by agitation at 60° C. for thirty minutes, cooled to 20–25° C. and the water layer again decanted so as to give a product having a pH of 8.8. The product was again washed with water followed by a small quantity of 37% aqueous HCl and the washing carried out with agitation at 60° C. for thirty minutes and thereafter cooled. The water was decanted and at this point the product had a pH of 8.2. The product was then dehydrated under a vacuum of 27″ mercury to give 10.67 parts of an epoxide resin which comprised 57% of the theoretical amount. Analysis of the resin showed it to contain 21.9% methylol groups and an epoxide value of 0.26 milliequivalent per gram.

It will be apparent that instead of the epichlorohydrin employed in the foregoing example, other hydrins corresponding to the general formula

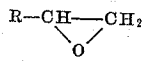

where R is a halogenated saturated aliphatic radical other than the chloromethyl radical in epichlorohydrin, for instance, chloroethyl, chloropropyl, etc., may be used without departing from the scope of the invention. In addition, instead of using the particular phenol of phenols described in the foregoing examples, other substituted phenols may be employed.

The molar ratio of the hydrin and the particular methylol phenate employed may also be varied within wide limits. Thus, although it is preferable to employ at least the same number of mols of hydrin, for example, epichlorohydrin, as there are phenolic hydroxyl groups or potential hydroxyl groups attached to the phenyl nucleus as, for example, the —OM group on the benzene nucleus, where M is, for instance, sodium, potassium, and barium, it will be apparent that smaller molar amounts of the hydrin may also be used whereby it is possible to obtain derivatives of only some of the phenyl-bonded OM groups in admixture with unmodified methylol phenol and methylol phenates.

The conditions of reaction for obtaining compound "A" may also be varied. The reaction to form the methylol phenate may be carried out at temperatures ranging, for example, from about room temperature to as high as 60–65° C. As pointed out previously, temperatures in excess of 65° C. show a decrease in the yield of the desired compounds, since at temperatures above 65° C. resinification of the methylol groups may begin to take place and increases rapidly as the temperature rises. However, reaction between the hydrin and the methylol phenate may be conducted at higher temperatures, for instance, as high as 75–100° C., preferably between 60–80° C., without undue condensation of the methylol groups.

*Example 2*

This example illustrates a typical composition of the invention.

A resinous composition was prepared having the following formulation:

| | Per cent by weight |
|---|---|
| Epon 1007 | 15.15 |
| Urea-formaldehyde condensate | 10.4 |
| Epichlorohydrin derivative of polymethylol phenol | 2.15 |
| Cresylic acid | 72.3 |

The formulation was prepared by dissolving the Epon in the cresylic acid and then blending in the urea resin and the epichlorohydrin derivative of polymethylol phenol. The resulting enamel was filtered through a pressure filter prior to enameling wire. It may be dyed, if desired, by adding a small amount of a suitable dye during the stirring.

*Example 3*

Following the procedure described in Example 2, another resinous composition was prepared having the following ingredients:

| | Percent by weight |
|---|---|
| Epon 1007 | 13.0 |
| Urea-formaldehyde condensate | 10.4 |
| Epichlorohydrin derivative of polymethylol phenol | 4.3 |
| Cresylic acids | 72.3 |

*Example 4*

A composition was prepared in accordance with the method disclosed in Martin 2,579,330, assigned to the assignee of the present invention, comprising (1) 1-allyloxy-2,4,6-tris-(hydroxymethyl) benzene and (2) a compound having the general formula

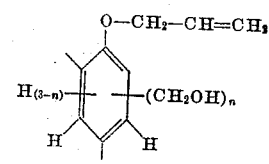

where $n$ is 1 or 2. This mixture of allyl ethers of methylol phenols was employed in formulating the following composition:

| | Percent by weight |
|---|---|
| Epon 1007 | 13.0 |
| Urea-formaldehyde resin | 10.4 |
| Methylol phenol allyl ethers | 4.3 |
| Cresylic acid | 72.3 |

The formulation was prepared by following the procedure of Example 2, the methylol phenol allyl ethers being substituted for the epichlorohydrin derivative of polymethylol phenol.

The compositions prepared in accordance with Examples 2, 3 and 4 were employed to coat several wires for the purpose of determining their suitablility as insulation. For additional comparison, several wires were coated with a standard polyvinyl formal wire-coating enamel.

The enameled electric conductors were prepared by drawing clean wire, for example, clean copper wire, through a body of enamel, substantially in accordance with the procedure outlined in Jackson et al. 2,307,588, assigned to the assignee of the present invention. More specifically, the wire was passed through a bath containing the wire enamel and thereafter the coated wire was subjected to heat by introducing it into an oven wherein the enamel was baked at the required temperature. The coating was baked simultaneously with the annealing of the copper. The wire was drawn through the bath at various speeds ranging from ten feet per minute to twenty feet per minute. The enamel was applied by dies to 0.0508 wire with a total insulation of approximately three mils being obtained. As is usually the case, it was necessary to run the wire successively through the enamel bath and baking oven several times at a constant speed in order to provide the total insulation desired.

Solvent resistance is determined by immersing the coated wires in a mixture of equal parts of toluene and ethanol and a 70/30 mixture of toluene and ethanol for approximately ten minutes and observing the effects of the mixed solvents. In the heat shock test, the conductor is wound on a mandrel equal to or greater than its diameter, and placed in an oven for a period of time. If the enamel is suitable as wire insulation, it will expand at the same rate that the copper expands, and will adhere uniformly to the copper. If it is an unsatisfactory insulating material, it rapidly becomes embrittled and flakes off. Elongation and flexibility are determined by winding conductors or wires around a mandrel equal to or greater than its diameter, after it has been stretched for a certain degree. For example, as indicated in the table, elongation and flexibility were determined on wire as it came out of the oven, after it had been stretched approximately 10% of its length, 20% of its length, and 30% of its length. In both the heat- shock, and the elongation and flexibility tests, it will be obvious that the most severe tests were those in which a mandrel equal to the diameter of the wire was employed since the wire is practically wound around itself. The abrasion resistance was determined by employing a General Electric abrasion tester using a 750-gram load, which is the weight used in the standard abrasion test for polyvinyl formal enamels.

In the following table, insulations (2), (3) and (4) correspond to the compositions of Examples 2, 3 and 4, respectively. The diameters of the mandrels employed are indicated as 1X, 2X and 3X, meaning respectively 1, 2 and 3 times the diameter of the wire tested.

The results tabulated above clearly show that the compositions of the invention are eminently suitable as insulation material for electrical conductors. The abrasion resistance of the enamels containing the epichlorohydrin derivative of the polymethylol phenol, although somewhat lower than the one containing polyvinyl formal resin, is still substantially above the minimum of thirty strokes required for polyvinyl formal resins. The properties of the two enamels containing the epichlorohydrin derivative of polymethylol phenol is substantially the same in every case, with the exception of the 1X, 30% stretch in the elongation and flexibility test, indicating that this property decreases with an increase in percentage of the derivative employed in the composition. Heat aging of the conductor insulated with the composition of Example 2 shows a clear advantage in hours to failure over the polyvinyl formal resin insulation and is indicative of the superiority of the compositions of the invention in this property. Heat-aging data was not obtained on the enamel containing the polymethylol phenol since the enamel was unsatisfactory in solvent resistance and flexibility. The enamels of the invention are obviously superior to those containing polymethylol phenols in flexibility, solvent resistance, and heat shock properties.

What I claim as new and desire to secure by Letters Patent of the United States is:

1. An insulated electrical conductor in which the insulation comprises a hard, flexible, tough, abrasion-resistant and solvent-resistant coating, said coating being the heat-treated product of a mixture of (1) from about 0.1 to about 7%, by weight of the mixture, of compounds corresponding to the general formula

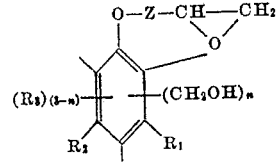

wherein Z is an alkylene radical, $R_1$, $R_2$ and $R_3$ are radicals selected from the class consisting of hydrogen, halogen, alkyl, aryl and aralkyl, and $n$ is a whole number equal to from 1 to 3, (2) from about 10 to about 17%, by weight of the composition, of a complex epoxide resin containing epoxy groups and comprising a polyether derivative of a polyhydric organic compound selected from the class consisting of polyhydric alcohols and phenols containing at least two phenolic hydroxy groups, (3) from about 7 to about 15%, by weight of

| Insulation | Polyvinyl Formal | (2) | (3) | (4) | Polyvinyl Formal | (2) | (3) | (4) |
|---|---|---|---|---|---|---|---|---|
| Temperature (°C.) | 300 | 300 | 300 | 300 | 300 | 300 | 300 | 300 |
| Wire Speed (1/min.) | 16 | 16 | 16 | 16 | 20 | 20 | 20 | 20 |
| Solvent resistance: | | | | | | | | |
| 50/50 | E | E | E | F | E | E | E | F |
| 70/30 | E | E | E | F | E | E | E | F |
| Heat shock: | | | | | | | | |
| 3X | E | E | E | E | E | E | E | E |
| 1X | E | E | E | E | E | E | E | E |
| Elongation and Flexibility: | | | | | | | | |
| 0% stretch | | | | | | | | |
| 3X | E | E | E | E | E | E | E | E |
| 2X | E | E | E | E | E | E | E | E |
| 1X | E | E | E | E | E | E | E | E |
| 10% stretch | | | | | | | | |
| 3X | E | E | E | E | E | E | E | E |
| 2X | E | E | E | E | E | E | E | E |
| 1X | E | E | E | F | E | E | E | E |
| 20% stretch | | | | | | | | |
| 3X | E | E | E | E | E | E | E | E |
| 2X | E | E | E | E | E | E | E | E |
| 1X | E | E | E | F | E | E | E | F |
| 30% stretch | | | | | | | | |
| 3X | E | E | E | F | E | E | E | E |
| 2X | E | E | E | F | E | E | E | E |
| 1X | E | E | F | F | E | E | F | F |
| Abrasion resistance 750 gm. load, strokes | 190 | 73 | 57 | 155 | 311 | 79 | 55 | 107 |
| Heat aging, hrs. to failure at 155° C.—1X | 63 | 84 | 84 | | 63 | 84 | 84 | |

E = Excellent.
F = Failed.

the mixture, of the condensation reaction product of urea and formaldehyde, and (4) from about 60 to about 80%, by weight of the mixture, of an organic solvent.

2. An insulated electrical conductor in which the insulation comprises a hard, flexible, tough, abrasion-resistant and solvent-resistant coating, said coating being the heat-treated product of the mixture of (1) from about 0.1 to about 7%, by weight of the mixture, of a product of reaction of an epihalogenohydrin with a mixture of ingredients containing as essential materials the three metal methylol phenates having the formulae:

(a) 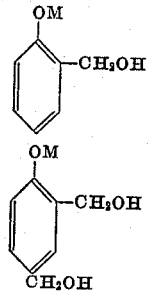

(b) 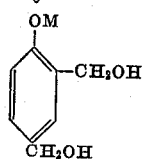

and (c) 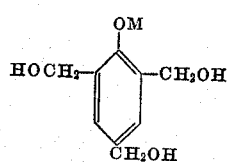

where M is selected from the group consisting of sodium, potassium and barium, (2) from about 10 to about 17%, by weight of the mixture, of a complex epoxide resin containing epoxy groups and comprising a polyether derivative of a polyhydric organic compound selected from the class consisting of polyhydric alcohols and phenols containing at least two phenolic hydroxy groups, (3) from about 7 to about 15%, by weight of the mixture, of the condensation reaction product of urea and formaldehyde and (4) from about 60 to about 80%, by weight of the mixture, of an organic solvent.

3. An insulated electrical conductor in which the insulating comprises a hard, flexible, tough, abrasion-resistant and solvent-resistant coating, said coating being the heat-treated product of a mixture of (1) from about 1 to about 4%, by weight of the mixture, of the product of reaction of epichlorohydrin with a mixture of ingredients containing as essential materials the three sodium methylol phenates having the formulae:

(a) 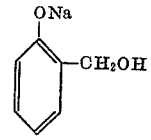

(b) 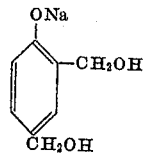

and (c) 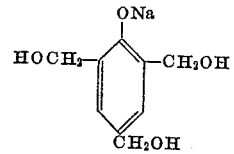

(2) from about 12 to about 16%, by weight of the mixture, of a complex epoxide resin comprising the reaction product of bis-(4-hydroxyphenyl) dimethyl methane and epichlorohydrin, (3) from about 9 to about 11%, by weight of the mixture, of a urea-formaldehyde resin, and (4) from about 70 to about 75%, by weight of the mixture, of an organic solvent.

References Cited in the file of this patent
UNITED STATES PATENTS

| | | |
|---|---|---|
| 2,528,359 | Greenlee | Oct. 31, 1950 |
| 2,659,710 | Martin | Nov. 17, 1953 |